UNITED STATES PATENT OFFICE.

RICHARD LAUCH, OF ELBERFELD, GERMANY, ASSIGNOR TO THE FARBENFABRIKEN, VORMALS FR. BAYER & CO., OF SAME PLACE.

SUBSTANTIVE BROWN DYE.

SPECIFICATION forming part of Letters Patent No. 503,148, dated August 15, 1893.

Application filed February 10, 1893. Serial No. 461,805. (Specimens.) Patented in Germany January 6, 1890, No. 61,950; in France February 21, 1891, No. 187,365, and in England February 25, 1891, No. 3,439.

*To all whom it may concern:*

Be it known that I, RICHARD LAUCH, doctor of philosophy, chemist, (assignor to the FARBENFABRIKEN, VORMALS FR. BAYER & CO., of Elberfeld,) a subject of the Emperor of Germany, residing at Elberfeld, Germany, have invented a new and useful Improvement in the Manufacture of Dye-Stuffs, (for which the aforesaid FARBENFABRIKEN has already obtained Letters Patent in the following countries: Germany, No. 61,950, dated January 6, 1890; France, No. 187,365, dated February 21, 1891, and England, No. 3,439, dated February 25, 1891,) of which the following is a specification.

My invention relates to the production of a new coloring-matter that dyes unmordanted cotton in neutral and alkaline baths and is obtained by combining one molecular proportion of tetrazodiphenylchlorid with one molecular proportion of salicylic acid and one molecular proportion of alphanaphthylamin by sulfonating the amidotetrazo compound thus produced, rediazotizing the resulting sulfo product, and combining the so formed diazosulfo compound with one molecular proportion of alphanaphthylamin.

In carrying out my invention practically I proceed as follows: 1.84 kilos, by weight, of benzidin are converted by means of 1.4 kilos, by weight, of sodium nitrite in a solution of dilute hydrochloric acid into tetrazodiphenylchlorid in the well known manner. The thus obtained solution of tetrazodiphenylchlorid is then added to an icy cold watery solution of 1.38 kilos, by weight of salicylic acid with the addition of a great quantity of sodium carbonate. When after some hours the production of the intermediate product is completed, a solution in water of 1.8 kilos by weight of alphanaphthylamin hydrochlorid is added to the above alkaline reaction mixture. The formation of the tetrazo compound having the formula:

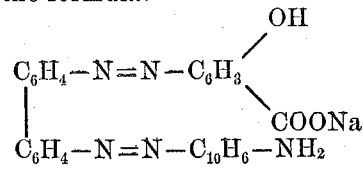

begins immediately and is complete after several hours standing. This sodium salt separates and is filtered off, washed and dried. Of course, the same tetrazo compound results, if tetrazodiphenylchlorid be at first combined with one molecular proportion of alphanaphtylamin and then with one molecular proportion of salicylic acid 5.09 kilos, by weight, of the sodium salt of this mixed tetrazo compound are, in thoroughly-dried state, slowly added to twenty kilos, by weight, of fuming sulfuric acid (containing twenty per cent. of anhydrid) at a temperature not rising above 30° centigrade. When a portion of the resulting mixture dissolves without any residue in alkali, the whole liquid is poured on ice and the separating sulfo derivative of the aforesaid mixed tetrazo compound is filtered off and redissolved in sodium carbonate. This alkaline solution, cooled with ice, is then mixed with 0.7 kilos, by weight, of sodium nitrite dissolved in about 3.5 liters of water, and hydrochloric acid is added, until the mixture shows a lasting acid reaction. The diazotizing is complete after about twelve hours, and the diazo compound produced which is filtered off, is added to a solution of dilute hydrochloric acid of 1.43 kilos, by weight, of alphanaphthylamin. The mixture is allowed to stand for about twelve hours at a low temperature, after which time the combination of the diazo compound with alphanaphthylamin is complete. Sodium carbonate is then added, and the alkaline liquid is mixed with common salt, in order to precipitate the dye-stuff which is filtered off, pressed and dried. It forms, after having been pulverized, a grayish black powder, which easily dissolves in water with brown color. It is somewhat soluble in alcohol with reddish-brown color. By ammonia it is dissolved with brown color. In sodium carbonate and sodi-lye it dissolves with difficulty at ordinary temperature, easily on heating, with reddish-brown color. In diluted hydrochloric and sulfuric acid it is almost insoluble. On adding ammonia or sodium carbonate to its watery solutions the color of the latter becomes somewhat more reddish, while the addition of soda-lye causes at first a redder color and subsequently the separation of dark reddish-brown flakes. If its watery solutions are mixed with diluted hydrochloric or sulfuric acid, they assume at first a dull brownish-black color, while after some time brownish-black flakes are separated. By concentrated sulfuric acid it is dissolved with violet color, and on the addition of ice water to this sulfuric acid solution the color becomes at first dull brown, and on adding a very great quantity of water the liquid becomes almost colorless. It produces on unmordanted cotton in a neutral or alkaline bath very fast and intensely brown shades. It also dyes half-woolen fabrics in neutral baths or such baths, as contain common salt, at temperatures from about 80° to 90° centigrade.

My new coloring-matter materially differs from that dye-stuff which I have described in a separate specification forming part of my Letters Patent No. 476,393, dated June 7, 1892, as the latter produces on unmordanted cotton in a neutral or alkaline bath greenish-black or dark gray shades and is obtained by the combination of tetrazodiphenylchlorid with salicylic acid and alphanaphthylamin in equimolecular proportions, sulfonation of the azo compound and coupling the diazo derivative of the resulting sulfo product with alpha-naphtholalphamonosulfo acid, while for the production of my new dye-stuff in place of alphanaphtholalphamonosulfo acid alphanaphthylamin is employed.

Having thus described my invention and in what manner it can be performed, that which I claim as new, and desire to secure by Letters Patent, is—

1. The process of producing a new substantive dye-stuff by combining one molecular proportion of tetrazodiphenylchlorid with one molecular proportion of salicylic acid and with one molecular proportion of alphanaphthylamin, by subsequently sulfonating the thus obtained tetrazo compound and coupling one molecular proportion of the diazo derivative of this sulfo product with one molecular proportion of alphanaphthylamin.

2. As a new product the coloring-matter, forming a grayish-black powder, soluble in ammonia with brown color; difficultly soluble in alcohol with red-brown color; difficultly soluble in carbonate of soda and caustic soda at ordinary temperature, easily on heating with reddish-brown color; almost insoluble in dilute hydrochloric and sulfuric acids; easily soluble in water with brown color, which on addition of ammonia or sodium carbonate turns slightly redder, and on addition of caustic soda turns at first redder, and finally separates dark reddish-brown flakes, while dilute hydrochloric or sulfuric acid changes the aqueous solution to a dull brownish-black, and causes a precipitation of brownish-black flakes; soluble in concentrated sulfuric acid with violet color, which, on addition of ice water becomes at first a dull-brown, and on addition of a large excess of ice water turns almost colorless; dyeing unmordanted cotton and half woolen fabrics an intense brown; and having the qualities substantially as specified.

In testimony whereof I have signed my name in the presence of two subscribing witnesses.

RICHARD LAUCH.

Witnesses:
WM. ESSENWEIN,
RUDOLPH FRICKE.

It is hereby certified that in Letters Patent, No. 503,148, granted August 15, 1893, upon the application of Richard Lauch, of Elberfeld, Germany, for an improvement in "Substantive Brown Dye," an error appears in the printed specification requiring the following correction, viz.: In line 92, page 1, the word "sodi-lye" should read *soda-lye*; and that the said Letters Patent should be read with this correction therein that the same may conform to the record of the case in the Patent Office.

Signed, countersigned, and sealed this 24th day of October, A. D. 1893.

[SEAL]

JNO. M. REYNOLDS,
*Assistant Secretary of the Interior.*

Countersigned:

JOHN S. SEYMOUR,
*Commissioner of Patents.*